United States Patent [19]
Shirley, Jr. et al.

[11] Patent Number: 5,211,985
[45] Date of Patent: May 18, 1993

[54] MULTI-STAGE PROCESS FOR CONTINUOUS COATING OF FERTILIZER PARTICLES

[75] Inventors: Arthur R. Shirley, Jr.; Keith D. Cochran, both of Florence, Ala.; Terence B. Lynch, London, Canada; Russell I. Derrah, Oakville, Canada; Sayeeda J. Quadir, Etobicoke, Canada; Zdzislaw M. Tulimowski, Sarnia, Canada

[73] Assignee: ICI Canada, Inc., Ontario, Canada

[21] Appl. No.: 773,273

[22] Filed: Oct. 9, 1991

[51] Int. Cl.⁵ .................................................. B05D 7/00
[52] U.S. Cl. .................................... 427/213; 427/221; 71/64.02; 71/64.06; 71/64.07; 118/303; 118/DIG. 5
[58] Field of Search ............... 427/213, 185, 221; 118/303, DIG. 5; 71/64.02, 64.06, 64.07, 64.11

[56] References Cited

U.S. PATENT DOCUMENTS

| | | |
|---|---|---|
| 2,600,253 | 6/1952 | Lutz . |
| 3,089,824 | 5/1963 | Wurster . |
| 3,112,220 | 11/1963 | Heiser, Jr. et al. ................. 427/213 |

(List continued on next page.)

FOREIGN PATENT DOCUMENTS

| | | |
|---|---|---|
| 76123/81 | 10/1981 | Australia . |
| 13560/83 | 3/1984 | Australia . |
| 544029 | 7/1957 | Canada . |
| 676215 | 12/1963 | Canada . |
| 754504 | 3/1967 | Canada . |
| 795279 | 9/1968 | Canada . |
| 797153 | 10/1968 | Canada . |
| 808109 | 3/1969 | Canada . |
| 981989 | 1/1976 | Canada . |
| 1049334 | 2/1979 | Canada . |
| 1111277 | 10/1981 | Canada . |
| 1144857 | 4/1983 | Canada . |
| 1159590 | 12/1983 | Canada . |
| 1186523 | 5/1985 | Canada . |
| 1188123 | 6/1985 | Canada . |
| 1252643 | 4/1989 | Canada . |
| 0047556A1 | 9/1981 | European Pat. Off. . |
| 0104282A1 | 9/1982 | European Pat. Off. . |
| 0252553A2 | 6/1987 | European Pat. Off. . |
| 0255752A2 | 8/1987 | European Pat. Off. . |
| 0289074 | 11/1988 | European Pat. Off. . |
| 2021259 | 11/1971 | Fed. Rep. of Germany . |
| 247852 | 7/1987 | Fed. Rep. of Germany . |
| 155587 | 6/1982 | German Democratic Rep. . |
| 42-24282 | 11/1967 | Japan . |
| 51-75674 | 6/1976 | Japan . |
| 52-38361 | 3/1977 | Japan . |
| 60-18640 | 5/1985 | Japan . |
| WO91/14663 | 10/1991 | PCT Int'l Appl. . |
| 80/6839 | 11/1980 | South Africa . |
| 84/1649 | 3/1984 | South Africa . |
| 1027079 | 4/1966 | United Kingdom . |
| 1334188 | 10/1973 | United Kingdom . |
| 1449643 | 9/1976 | United Kingdom . |
| 1558411 | 1/1980 | United Kingdom . |
| 1588641 | 4/1981 | United Kingdom . |

OTHER PUBLICATIONS

Ormos et al., "Granulation and Coating in Multicell Fluidized Bed", pp. 545-554 (undated).
"Fluidization Technology", vol. II, (McGraw-Hill), pp. 545-554 (1976).
"Manual For Determining Physical Properties Of Fertilizer", pp. 5, 7 (1986).
"Microcapsule Processing And Technology" (Marcel Dekker 1979), pp. iii, v, vii, viii, ix, 1-181.

Primary Examiner—Shrive Beck
Assistant Examiner—Terry J. Owens
Attorney, Agent, or Firm—Cushman, Darby & Cushman

[57] ABSTRACT

An apparatus and method for continuously producing polymer coated particles, and in particular, a polymer coated fertilizer, wherein the coating material used is, for example, an aqueous film forming latex. The coating process is conducted with a plurality of fluidized beds, connected in series, under conditions such that, preferably, the relative humidity of the air in the initial coating zones is maintained below the critical relative humidity of the particle to be coated.

38 Claims, 2 Drawing Sheets

U.S. PATENT DOCUMENTS

| | | |
|---|---|---|
| 3,117,027 | 1/1964 | Lindlof et al. . |
| 3,143,410 | 8/1964 | Smith .................................. 71/64.07 |
| 3,192,031 | 6/1965 | Zunyenga . |
| 3,196,827 | 7/1965 | Wurster et al. . |
| 3,206,297 | 9/1965 | O'Connor . |
| 3,223,518 | 12/1965 | Hansen ................................ 71/64.07 |
| 3,241,520 | 3/1966 | Warster et al. ...................... 118/303 |
| 3,253,944 | 5/1966 | Wurster . |
| 3,264,088 | 8/1966 | Hansen . |
| 3,295,950 | 1/1967 | Blouin et al. . |
| 3,331,677 | 7/1967 | Campbell et al. . |
| 3,336,128 | 8/1967 | Holik . |
| 3,342,577 | 9/1967 | Blouin et al. . |
| 3,372,019 | 3/1968 | Fox . |
| 3,400,011 | 9/1968 | Fox . |
| 3,408,169 | 10/1968 | Thompson et al. . |
| 3,533,829 | 10/1970 | Quanquin . |
| 3,558,299 | 1/1971 | Baskin . |
| 3,598,563 | 8/1971 | Burch . |
| 3,686,373 | 8/1972 | Griesheimer et al. . |
| 3,703,364 | 11/1972 | Jordan . |
| 3,725,029 | 4/1973 | Blacknore . |
| 3,818,605 | 6/1974 | Glatt . |
| 3,992,558 | 11/1976 | Smith-Johannsen et al. . |
| 4,019,890 | 4/1977 | Fujita et al. . |
| 4,032,319 | 6/1977 | Smith et al. . |
| 4,082,533 | 4/1978 | Wittenbrook et al. . |
| 4,142,885 | 3/1979 | Heumann et al. . |
| 4,198,782 | 4/1980 | Kydonieus et al. . |
| 4,237,814 | 12/1980 | Ormós et al. ........................ 118/303 |
| 4,369,055 | 1/1983 | Fujita et al. . |
| 4,425,465 | 1/1984 | Padget et al. . |
| 4,485,103 | 11/1984 | Pasarela . |
| 4,521,239 | 6/1985 | Simms et al. . |
| 4,525,198 | 6/1985 | Van Hijfte et al. . |
| 4,610,715 | 9/1986 | Monaldi et al. . |
| 4,636,242 | 1/1987 | Timmons . |
| 4,639,383 | 1/1987 | Casey . |
| 4,657,576 | 4/1987 | Lambie . |
| 4,670,039 | 6/1987 | Sjogren . |
| 4,689,297 | 8/1987 | Goshen et al. . |
| 4,711,659 | 12/1987 | Moore . |
| 4,741,956 | 5/1988 | Thaler et al. . |
| 4,756,738 | 7/1988 | Detroit . |
| 4,759,956 | 7/1988 | Amer et al. . |
| 4,772,490 | 9/1988 | Kögler et al. ........................ 71/64.07 |
| 4,804,403 | 2/1989 | Moore . |
| 4,828,882 | 5/1989 | Tsezos et al. . |
| 4,969,947 | 11/1990 | Moore . |
| 4,990,371 | 2/1991 | Dutta et al. ........................ 427/213 |
| 5,089,041 | 2/1992 | Thompson et al. ................ 427/213 |

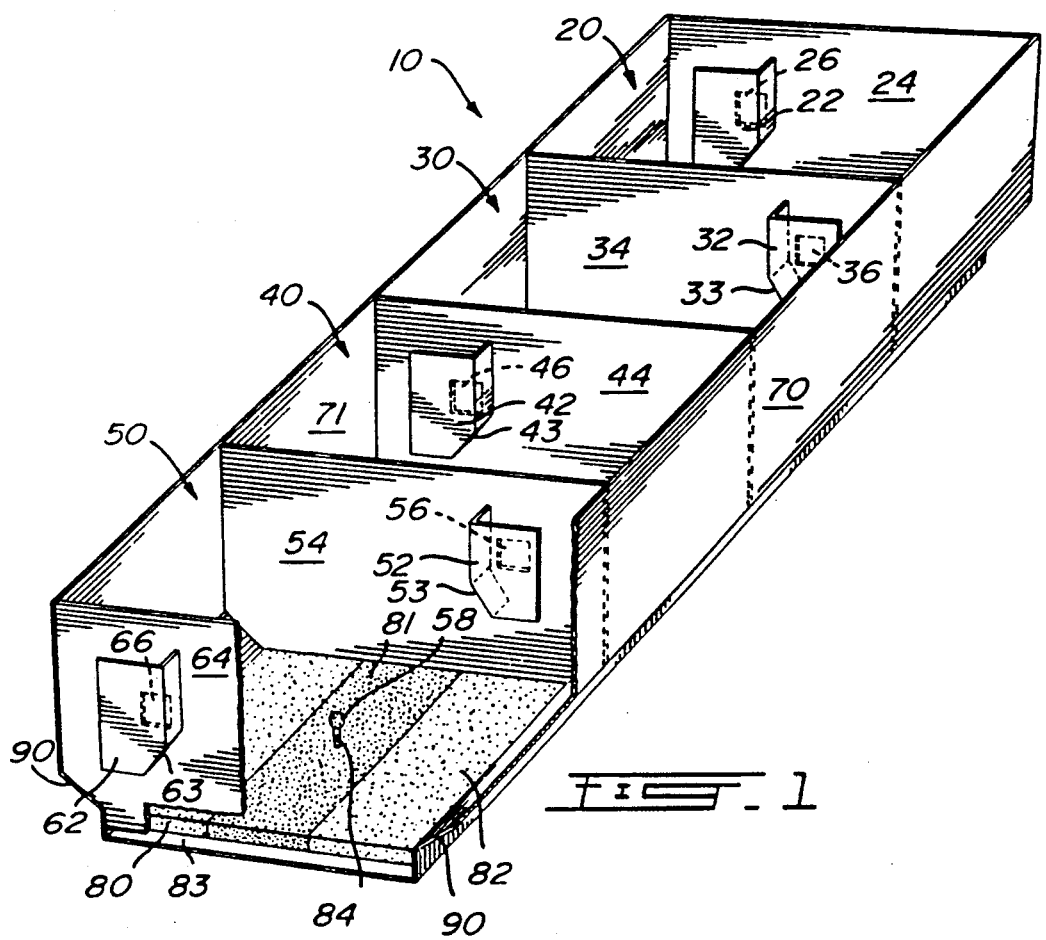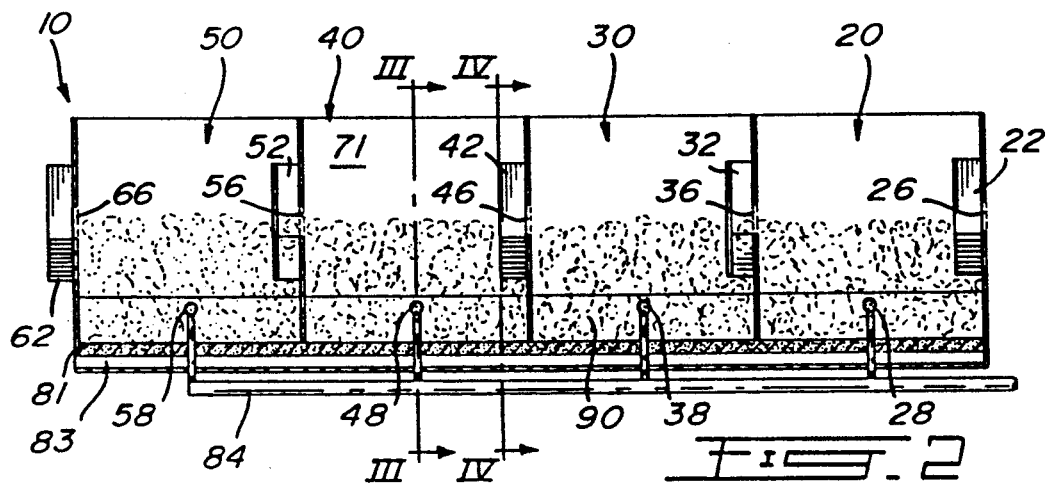

MULTI-STAGE PROCESS FOR CONTINUOUS COATING OF FERTILIZER PARTICLES

FIELD OF THE INVENTION

This invention relates to processes for coating a particulate material with a coating composition and, more particularly, to the production of a coated water soluble fertilizer having a prolonged and controlled release rate.

BACKGROUND OF THE INVENTION

Most commercial fertilizers, such as urea, dissolve quickly in water. When applied to lawns or agricultural crops, most of the fertilizer dissolves rapidly in the moisture in the soil. Often, such fertilizers dissolve at a rate that exceeds the rate at which it can be used by plants. This can cause a number of significant problems. First, the excess fertilizer can leach into the groundwater, where it can cause potentially serious environmental damage. In addition, excessive concentration of fertilizer in the vicinity of a plant may result in "burning" of the plant roots.

Because of these problems, it is often necessary to apply these fertilizers in several light doses throughout the growing season, rather than in a single heavy application. However, the need for repeat applications increases labor costs. Worse, repeat applications may cause physical damage to the growing plants because the fertilizer spreading equipment must pass over the plants several times.

In order to avoid the need for repeat applications, various slow and controlled release fertilizers have been developed. As used herein, the term "slow and controlled release fertilizer" is intended to mean a fertilizer with a prolonged and controlled release rate. These fertilizers are applied at the beginning of the growing season and provide an initial high release of fertilizer followed by a slower, gradual release throughout the growing season. Slow and controlled release fertilizers are widely used on home lawns, public lawns, golf courses, home gardens, plant nurseries, and on horticultural crops.

A. Coated Slow-Release Fertilizers

A commonly used type of slow and controlled release fertilizer is made by coating a water soluble plant nutrient with a material which is more slowly soluble. Such coated fertilizers typically use a fertilizer granule, particle, prill or the like, as a substrate or core. This fertilizer substrate is coated with a material having a low permeability in water. The coating material provides a water barrier shell around the fertilizer and, thus, provides controlled release rates by controlling the rate at which the fertilizer core dissolves. A number of such coating materials have been used, including sulfur, gypsum, talc, petroleum waxes, chemical resins, asphalt, and the like.

In making coated slow and controlled release fertilizers, it is essential to keep the coating thickness among the particles as uniform as possible to give the fertilizer a consistent, controlled release rate. It is also desirable to keep the layer of coating material as thin as possible. Thin coatings are desirable because the coating dilutes the fertilizer, thereby decreasing the amount of plant nutrients per unit weight of coated product. This, in turn, increases the cost for transportation, storage, production and application of the fertilizer. Because materials which provide a strong water barrier may be applied as a relatively thin coating, they are generally preferred for making slow and controlled release fertilizers.

When sulfur is used as a coating, defects such as pinholes and cracks may appear in the coating during production, handling, and storage. This, in turn, makes it difficult to control the release rate of the granules. In addition, sulfur is sprayed onto the fertilizer substrate as a molten liquid. As a result, the cost of handling sulfur coating tends to be higher due to the costs of heating, pumping, and spraying the molten sulfur stream. Finally, sulfur must be applied as a relatively thick coating on the fertilizer. As noted above, this is undesirable, since thicker coatings dilute the amount of available fertilizer. A layer of wax may be added on top of a sulfur coating to improve the physical characteristics of the coating. However, this added coating material only increases the cost of production and further dilutes the available fertilizer.

Organic resin coatings typically have better water barrier properties than sulfur so that thinner coating layers may be applied. There are four basic types of resin coatings: (1) organic resins in molten form, (2) organic resins dissolved in organic solvents, (3) organic resins formed by the reaction of two or more components on the surface of the particles, and (4) organic resins dissolved or dispersed in water.

Examples of the first type of resin coating—organic resins in molten form—include molten polyethylene-based resins. A drawback of these coatings is that high temperatures and specialized handling and delivery systems are required. Once again, this tends to increase the cost of applying such coatings. In addition, it is often difficult to obtain a uniform coating thickness on the particles because the coating must be cooled rapidly.

The second type of resin coating is a solution of resin in organic solvents. The main flaw with this type of coating is that when the coating dries, the organic solvents evaporate. Since these solvents are costly and are generally subject to stringent environmental controls, they may not be released directly into the atmosphere. Therefore, it is usually necessary to use complex and expensive solvent recovery systems and environmentally safe effluent systems to collect the solvents, condense them, and recycle them for reuse.

The third type of resin coating—two or more component organic systems—have also been used. In these systems, two or more reactive constituents are applied to the fertilizer substrate where they react to form a water insoluble coating. However, these systems often involve handling high solid content and toxic organics, which also require complex effluent absorbent materials and environmental controls.

The fourth basic type of resin coating is an organic resin dissolved or dispersed in water. When the resin is dissolved in water, the system is called an "aqueous solution" of resin. Unfortunately, conventional aqueous solutions also have a number of drawbacks, including the low concentration of resin and the high viscosity (thickness) of the solutions. Because of these problems, it has been proposed to use aqueous "dispersions" and "latexes" of organic resins as coating materials. Such coatings are preferable from an environmental standpoint, since they are carried in water. They are also easier to handle and, because they have superior water barrier characteristics, can be applied in relatively thin coating layers.

When applied in conventional coating processes, however, latex coatings can adversely affect the water soluble fertilizer core material. Water sensitive particles, including some fertilizers, typically absorb moisture from the air once the "critical" relative humidity of the particular fertilizer is exceeded. Critical relative humidity is defined as that humidity of the atmosphere above which a material will absorb moisture and below which it shows a drying tendency. (See "Manual for Determining Physical Properties of Fertilizer," International Fertilizer Development Center, Muscle Shoals, Alabama.) Examples of critical relative humidity values for common fertilizers at 30° C. are: urea, 70–75%; ammonium sulfate, 75–85%; diammonium sulfate, 70–75%; potassium sulfate, 80–85%; and potassium chloride, 70–80%.

Above the critical relative humidity, uncoated fertilizer particles absorb water, causing a disruption of the particle surface. This can result in a failure of the coating to properly adhere to the granule and in poor coverage of the particle surface, particularly when latexes or other aqueous-based coatings are used. Water may then penetrate into the water soluble core and prematurely dissolve the fertilizer particle. Even worse, the dissolved fertilizer substrate material may re-precipitate in the coating as fertilizer crystals. If this occurs, and the coated particles are applied as a slow and controlled release fertilizer, the fertilizer crystals in the coating surface rapidly dissolve and can provide a path for water to enter the central core of the fertilizer particle. Thus, the fertilizer core can be prematurely released and the desired controlled release rate may not be obtained.

The concept of critical relative humidity has been used to determine the appropriate conditions for storing and handling fertilizers. However, as will be seen from the following discussion, to date this concept has not been used in conventional coating processes for the manufacture of coated slow and controlled release fertilizers.

B. Coating Processes

In general, particle coating processes can be divided into two basic types: "batch-type" processes and "continuous" processes. In batch-type processes, a predetermined amount of granules is charged into a coating vessel. After the granules are coated, the process is stopped and the granules are removed for further processing. Because of the need to constantly load and unload the coating vessel, batch-type processes tend to be less efficient and more costly to operate, particularly in commercial manufacturing operations where large quantities of coated fertilizer must be produced.

In continuous processing, on the other hand, a stream of granules is fed into the coating vessel where they are coated and continuously discharged for further processing. In this way, coating can continue without the frequent interruptions needed to load and unload the coating vessel. For this reason, it is generally preferable to utilize continuous processes in manufacturing operations.

Both batch and continuous processes have been conducted in several types of conventional coating apparatus. One type of apparatus uses a large cylindrical drum as the coating vessel. The particles to be coated are charged into the drum, the drum is rotated, and a coating is applied to the tumbling particles, generally by spraying. A second type of apparatus is a rotary pan. As with the drum coater, the particles are fed onto the pan, the pan is rotated, and the coating is applied to the particles.

When rotary drums and pans are used in continuous processes for coating fertilizer granules, it has been difficult to obtain granules having the uniformity of coating thickness needed to make high quality slow and controlled release fertilizers. When rotary pans are used, it is difficult to ensure that the particles are retained on the pan for a sufficient period of time so that they are covered with adequate amounts of coating. Also, since the pans are open to the atmosphere, control of the relative humidity in the vicinity of the particles is infeasible. When drums are used, it has been difficult to achieve uniform coating thickness on the particles.

As a result, when used for coating, rotary drums and pans generally have been used in less desirable batch coating processes. An example of the use of a rotary pan in a batch process is found in Japanese Patent Application Publication No. 60[1985]-18,640, published May 11, 1985. This document discloses a method of producing a slow release fertilizer using an aqueous-based coating formulation. The aqueous coating material is applied in two batch-type process steps. First, the particles are charged into a rotary pan. The tumbling granules are sprayed intermittently with an aqueous dispersion of a film-forming resin. This is followed by a second application of the same coating. As noted above, it is difficult to control the relative humidity in the vicinity of the particles, since rotary pans are open to the atmosphere. After coating, the granules are removed from the rotary pan for further processing. The need to stop the process periodically in this way is a significant drawback of batch processes, as noted above.

A third type of coating apparatus is the so-called "fluidized bed." Because the term fluidized bed is used to describe a number of different types of apparatus, it is useful to distinguish between "true" fluidized beds and other apparatus which are actually modified fluidized beds. In a true fluidized bed, particles are kept in a randomly moving, fluidized condition by a stream of pressurized gas. This is usually accomplished by placing the particles on a perforated metal plate. A pressurized gas is forced through the perforations in the plate, and the gas causes the particles to fluidize. True fluidization is characterized by the particles moving in a random, turbulent fashion similar to a gently boiling liquid.

To date, true fluidized beds have generally been used to granulate particles, rather than to produce coated slow and controlled fertilizers. For example, in the continuous processes described in the treatise *Fluidization Technology* (Keairns ed., McGraw-Hill 1976), fertilizer particles pass through a number of fluidized bed cells where they are first granulated and then coated. The coating takes place in a single cell and is used to "de-dust" the particles rather than to provide the consistent coating required for slow and controlled fertilizers. Moreover, the design of such apparatus makes it difficult to obtain a uniform coating thickness on the granules. As a result, such processes have not been widely used in the production of slow and controlled release fertilizers.

When used to coat particles, including fertilizer particles, fluidized beds have been substantially modified. As explained in greater detail below, these modified apparatus are also unable to produce particles having the uniform coating thickness necessary for the production of slow and controlled release fertilizers. A classic example of a modified fluidized bed process is the so-called "Wurster" coating process, named after its inventor, D.E. Wurster. Wurster suggested modifying a fluidized bed so that the particles are forced to flow in a controlled, cyclical pattern instead of in a random, fluidized manner: "Fluidized beds in general are characterized by randomness of particle motion. It has been found that such random motion is undesirable and particularly so when coating tablets or larger particles. Therefore velocity differences which set cyclic flow patterns as herein described are fundamental to the rapid application and development of smooth 'elegant' surfaces." (See Wurster Canadian Patent No. 676,215, Dec. 17, 1963, p. 3.)

Various apparatus were designed to induce controlled, cyclical flow of the particles, and to prevent the random motion characteristic of a true fluidized bed. Examples of such apparatus can be found in U.S. Pat. Nos. 3,241,520, 3,196,827, 3,117,027, and 3,089,834, and in Chapter 14 of the treatise *Microcapsule Processing and Technology*, by A. Kondo (Marcel Dekker 1979). Generally, these apparatus are designed to force the particles to flow in a controlled, cyclical manner by providing two zones of differing gas velocity. In the high velocity zone, a jet of gas is used to propel or pneumatically convey the particles upwardly. In the low velocity or "subsidence" zone, the gas velocity is maintained at a much lower level, so that the particles fall under the influence of gravity. A spray nozzle is positioned in the high velocity zone to coat the particles while they are being pneumatically conveyed upwards. The coating tends to dry while the particles are falling in the subsidence zone. This cycle is repeated to build up a coating on the particles.

This general principle has been applied in a number of batch-type coating processes. For example, U.S. Pat. Nos. 3,241,520 and 3,196,827 disclose a particle coating apparatus in which the high and low velocity zones are physically separated by a partition or a cylindrical column. In these systems, the particles are pneumatically conveyed upwardly and are forced to "spout" violently over the top of the partition into the subsidence zone in a manner resembling a fountain of water. From the subsidence zone, the particles are recycled back to the high velocity zone. U.S. Pat. No. 3,241,520 also discloses an apparatus in which several of these partitioned chambers are connected in series. However, unlike a single bed, in which the particles make multiple cycles through the coating spray, the particles only move through the high velocity zone once. After falling into the subsidence zone, the particles are carried to the next chamber, where the process is repeated. Because the particles collect in the subsidence zone, however, agglomeration and disruption of the coating can occur.

U.S. Pat. Nos. 3,117,027 and 3,089,824 and Canadian Patent No. 676,215 disclose Wurster-type apparatus in which the high and low velocity zones are created in a chamber which is not physically partitioned. High and low velocity zones are provided by positioning a plate with large and small apertures at the bottom of the bed or by other means. In this way, a jet of gas is created in one area of the bed to induce the "spouting," cyclical particle motion characteristic of Wurster coating processes. Similar batch-type "spouted bed" coating processes are disclosed in U.S. Pat. Nos. 4,369,055 and 4,019,890 to Fujita et al.

Wurster-type coating processes and apparatus suffer from a number of drawbacks which make them generally unsuitable for the production of slow and controlled fertilizers. First, despite the cyclical flow of particles, a percentage of the particles can miss being sprayed with significant amounts of coating, while other particles are covered with excessive amounts of coating. This causes an undesirable variation in coating thickness which, in turn, causes the release rate of the fertilizer to fall outside acceptable limits. In addition, the Wurster-type apparatus mentioned above are designed for batch operation and, therefore, suffer from the inherent drawbacks of batch operation noted above. Problems with agglomeration of particles and difficulty obtaining thin coatings when using Wurster-type processes have also been reported. In this regard, see Canadian Patent No. 1,049,334 to Worts et al. and *Microcapsule Processing and Technology*, p. 147.

Attempts have been made to adapt Wurster-type coating apparatus for continuous coating operations. However, such apparatus are also unsuitable for producing slow and controlled release fertilizers. For example, Japanese Patent No. 42-24282 discloses a multi-chamber unit designed for continuous coating of pharmaceutical products, animal feeds, and the like. A high speed stream of gas is used to create an upwardly moving "jet stream" dispersed particle layer in the center of each chamber. The particles fall in the outer portions of the chamber (which are not maintained in a fluidized condition), and are then channeled back into the central jet stream. The number of chambers may be increased to improve the uniformity of the coating and coatability of the particles.

Like other Wurster-type apparatus, however, this process is unable to obtain the uniformity in coating thickness required for the production of slow and controlled release fertilizers. In addition, the apparatus is designed to cause the particles to grind together in the coating chambers and transfer tubes. While this may be desirable when coating pharmaceutical products, such grinding would damage the delicate coating layer of slow and controlled release fertilizers, resulting in uncontrolled release rates, and could also cause the particles to agglomerate.

All of the coating processes described above, as well as other conventional coating apparatus, also suffer from a further significant weakness: they are not designed to maintain the conditions needed to properly coat fertilizer particles, especially the conditions needed to coat water sensitive particles with aqueous-based coatings. For example, Japanese Patent Application No. 60[1985]-18,640, discussed above, does not disclose the need to control the humidity in the coating chamber, but merely recommends controlling the temperature. This document recommends that aqueous-based coatings be applied at temperatures above the minimum temperature at which the resin forms a continuous film (the "glass transition temperature") so that the coating coalesces and dries rapidly on the substrate particles to prevent agglomeration. Similarly, U.S. Pat. No. 4,759,956 to Amer et al. discloses a batch process for coating detergent particles in a Wurster-type apparatus. The inventors recommend maintaining the temperature in the reactor within a certain range of the glass transition temperature of the coating material so that the polymer material flows together, coalesces, and dries. No mention is made of controlling the inlet air relative humidity. Because it is critical to control the relative humidity when coating water sensitive fertilizers, such processes cannot be used to make high quality slow and controlled release fertilizer, particularly when aqueous-based coatings are used.

Even coating processes which attempt to control relative humidity are not designed to facilitate coating water sensitive fertilizer particles. For example, Canadian Patent No. 1,049,334 to Worts et al. discloses that small particles of water sensitive materials may be coated in a fluidized bed. The particles are coated with an aqueous solution or dispersion of a film forming coating agent by maintaining the relative humidity of the outlet air from the reactor at less than 100%. Because the principal focus of this patent is coating small particles of detergent additives (such as enzymes), this patent does not provide for the control of inlet air relative humidity to ensure the relative humidity in the coating chamber is maintained below the critical relative humidity which is needed to make slow and controlled release fertilizers. Rather, the purpose of controlling the relative humidity of the outlet air is to ensure that moisture evaporates more easily from the coating so that it solidifies rapidly without agglomeration of particles. However, controlling the relative humidity of the outlet air does not ensure that the appropriate relative humidity is maintained in the inlet to the reactor and within the reactor so that the substrate particles do not absorb moisture prior to coating, a necessity, particularly in the first coating zone.

To summarize, improvements in the technology for coating particles are needed. As noted above, conventional coating apparatus and processes do not provide a continuous process for coating particles with a consistent, intact coating of a uniform thickness and in which the coating has a narrow coating weight distribution across the population of coated particles. Further, conventional apparatus and processes do not adequately address the adverse effects of coating a water sensitive fertilizer with an aqueous coating at a relative humidity which is above the critical relative humidity. Thus, when conventional processes are used in coating water soluble fertilizers, under conditions in which the relative humidity of the spray zone is not controlled adequately, the surface layer of the substrate will be dissolved and, in particularly serious situations, the particles will agglomerate.

Thus, it would be desirable to produce a slow and controlled release fertilizer having narrow distribution of coating thickness in an efficient and cost-effective manner. It would also be desirable to overcome the disadvantages of the current methods of producing coated fertilizers by providing a continuous process which produces fertilizer having such a narrow coating thickness distribution and in which the substrate is prevented from absorbing moisture prior to being coated.

SUMMARY OF THE INVENTION

Accordingly, it is an object of the present invention to provide coated particles having a narrow distribution of coating thickness (i.e., so that the majority of particles have the same or similar coating thicknesses).

It is a further object of the present invention to provide a coating process which produces coated particles having such a narrow coating thickness distribution and which operates in a continuous manner.

It is yet a further object of the present invention to provide a coating process in which the residence time of the particles in the coating spray is controlled so that the particles can be evenly and consistently coated.

It is yet a further object of the present invention to provide a coating process in which aqueous-based coating solutions (such as latex coatings), which are preferable from an environmental standpoint, may be used as the coating material without disrupting the surface of the granule.

It is yet a further object of the present invention to provide a fertilizer coating process in which water sensitive fertilizer substrates may be evenly and consistently coated without absorbing moisture prior to being coated.

These and other objects are accomplished by providing a multistage fluidized bed apparatus for the continuous coating of fertilizer substrate particles. The apparatus includes a plurality of fluidized bed zones in which substrate particles to be coated are maintained in an essentially fluidized condition characterized by substantially random particle motion. At least two of the fluidized bed zones include spraying means for applying a coating material onto particles in said fluidized bed zones, so as to provide a plurality of fluidized bed coating zones. Means are also provided for continuously feeding and controlling the feed rate of substrate particles into a first fluidized bed coating zone and for transferring the particles from a first fluidized bed coating zone to a second fluidized bed coating zone. Preferably, the transfer means are adapted to prevent substantial "back-flow" of the particles to a previous coating zone so that the residence time of the particles in the coating zones may be carefully controlled. Finally, means are provided for continuously removing substrate particles from the second fluidized bed coating zone.

By providing a plurality of fluidized bed coating zones, the probability of the particles being insufficiently or excessively coated is substantially reduced as compared to an apparatus having only one coating zone. As the number of coating zones is increased, the probability of bypassing the coating spray in all zones of the apparatus is reduced. Likewise, the probability of being excessively sprayed in too many coating zones is reduced. Accordingly, the apparatus may have five, and even ten or more, fluidized bed coating zones. In a ten coating zone apparatus, the probability of a particle not being sufficiently coated in the beds, or remaining for an extended time in an excessive number of beds, is statistically negligible. In one embodiment of the invention, the means for transferring particles from one coating zone to another are specially adapted to prevent backflow of the particles, i.e., backward movement to a previous coating zone. In this way, the average residence time of the particles in the coating zones may be carefully controlled so that uniform coating thicknesses are obtained.

The present invention moves away from the approach recommended in the Wurster-type coating processes described above. The present apparatus and process maintain the particles in an essentially fluidized condition, i.e., a condition in which the particles move in a random, gentle rolling fashion in the coating zones, instead of pneumatically conveying the particles in a cyclical fashion.

A further aspect of the present invention is proper control of the humidity in the fluidized bed coating zones, particularly when water sensitive fertilizer particles are being coated. The present invention applies the concept of critical relative humidity to the coating of fertilizer particles by maintaining the humidity in the fluidized bed coating zones (and, most importantly, the first coating zone) below the critical relative humidity of the substrate particles. In this way, the particles do not absorb moisture prior to coating and the coating process is facilitated. After a first coating has been applied, the water barrier property of the coating allows the fertilizer to be further coated, stored, and handled at relative humidities higher than the critical relative humidity without agglomeration of the coated fertilizer granules.

In a further aspect, the present invention also provides a continuous process for coating fertilizer substrate particles with a coating material using the multistaged fluidized bed apparatus described above. Further processing steps, including preheating the particles, drying the particles between coating applications, "post-heating" the particles, and applying a conditioning agent to prevent agglomeration of particles, may also be used.

The present invention also provides a particulate composition comprising a coated substrate, preferably a coated water sensitive particle, and more preferably a slow and controlled release fertilizer, prepared according to the process of the present invention. The coated particles have the narrow distribution of coating thicknesses essential for slow and controlled release fertilizers. In a preferred form, the particulate composition comprises a fertilizer particle core covered by a dried, coalesced film from an aqueous film forming latex.

Thus, a major advantage of the present invention is the ability to prepare coated particles which have a narrow distribution of coating weights (i.e., in which the majority of particles have essentially the same coating thickness) on a continuous basis.

BRIEF DESCRIPTION OF THE DRAWINGS

The present invention will now be described by way of example only, with reference to the attached drawings, in which:

FIG. 1 is a perspective view of a fluidized bed coating apparatus according to the present invention;

FIG. 2 is a longitudinal cross-sectional view of the coating apparatus of FIG. 1;

DETAILED DESCRIPTION

Figure 3:
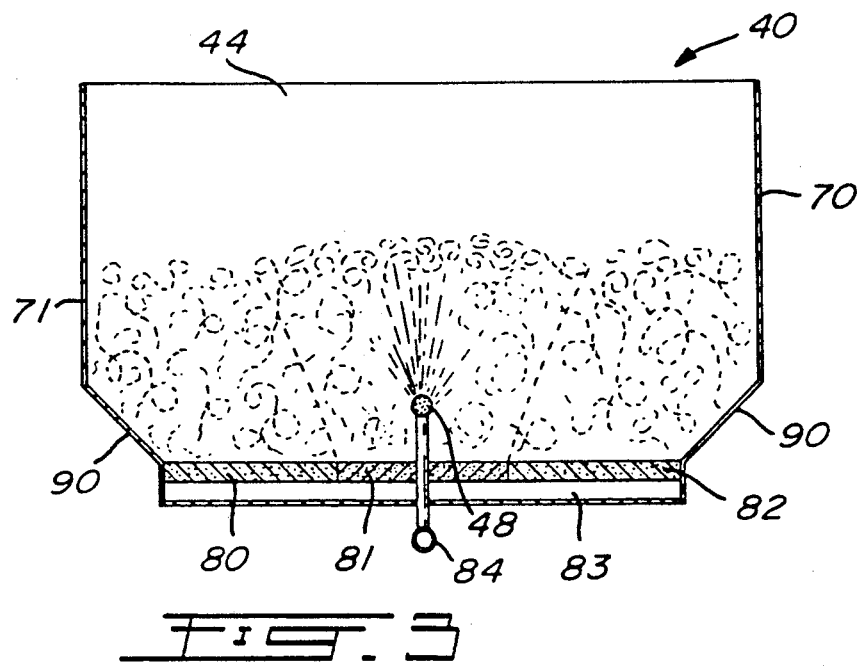
FIG. 3 is a transverse cross-sectional view of one coating zone of the coating apparatus of FIG. 2 along the line III—III.

In FIGS. 1 and 2, one embodiment of a fluidized bed apparatus 10 according to the present invention is shown having four distinct fluidized bed coating zones 20, 30, 40 and 50. Each coating zone has a hollow feeder conduit 22, 32, 42, and 52. Feeder conduit 22, which is located in coating zone 20, is attached to end plate 24. Feeder conduits 32, 42 and 52 are attached to bed partitions 34, 44, and 54. An additional feeder conduit 62 is attached to end plate 64. Immediately above feeder conduits 32, 42, 52, and 62, there are openings 36, 46, 56 and 66 in partitions 34, 44, 54 and in end plate 64.

Partitions 34, 44, and 54, and end plates 24 and 64 extend from across the entire fluidized bed coating zone and are attached to side plates 70 and 71 so that each coating zone has an essentially continuous wall around each side of the zone. In FIG. 1, end wall 64 and side wall 70 are shown in partial cut- away to show a view of the interior of coating zone 50.

In FIGS. 1 and 2, each fluidized bed coating zone is depicted as being a distinct fluidized bed which is separated from adjacent fluidized bed coating zones by partitions 24, 34, 44, 54. As used herein, "distinct" means that each fluidized bed is separated from other fluidized beds by a partition which essentially seals one fluidized bed from the next bed. Particles, however, are able to pass from one bed to the next in an essentially continuous manner by providing means, such as conduits, baffles, tubes, shields and the like, for transferring particles from one coating zone to another.

It will also be understood, however, that each fluidized bed coating zone may be an area in the vicinity of a spray nozzle, provided that the particles move in succession from the vicinity of one spray nozzle to a subsequent spray nozzle. For example, the apparatus could be a long narrow fluidized bed with baffles so that the particles move along the bed while passing through the spray of a number of different coating nozzles.

The substrate particles to be coated in the apparatus may include fertilizers, such as, for example, potassium nitrate, potassium chloride, other potassium salts, ammonium nitrate, ammonium sulfate, ammonium phosphate, other ammonium salts, or an NPK fertilizer, including an NPK composite. A preferred fertilizer for use in the present invention, however, is urea and, preferably, urea produced in a "falling curtain" drum. One type which has been used with particular success is urea which has been treated so as to comprise 0.1 to 2.0% by weight of formaldehyde or a lignosulfonate. The formaldehyde or lignosulfonate is added to the molten urea to provide granules which are harder, less friable, and have a reduced caking tendency than untreated urea. It will be understood by those skilled in the art, however, that other substrate particles may be used, including, by way of example, additive-free urea, prills, materials granulated by other conventional means (including rotary pans, rotary drums, as well as fluidized beds), in addition to compacted, crystallized and agglomerated materials.

In order to establish a continuous, even coating around the particles, it is preferred that the substrate particles be essentially round and smooth. Thus, the particles preferably have no irregular protrusions or voids on their surfaces. To improve particle smoothness and roundness, the particles (and, in particular, more dusty particles) may be pre-treated by means well known in the art such as, for example, granulation in a fluidized bed or rotary pan, or by polishing.

A pressurized stream or flow of gas is used to maintain the particles in a randomly moving, essentially fluidized condition in the fluidized bed zones. Any suitable gas may be used for this purpose. Preferred gases include for example, nitrogen, air, and, in particular, heated, dry air. However, It will be understood that inert gases, such as nitrogen, carbon dioxide, oxygen-reduced air, or similar inert gases, would be preferred when the plastic or resin coating is carried in a flammable carrier, such as an organic solvent. In this way, the risk that the solvent will ignite or explode can be significantly reduced. The solvent may be separated from the gas and, if desired, recycled using means known to those skilled in the art. In the embodiment of the invention depicted in FIGS. 1-4, air is used as the fluidizing gas. Air is fed through air supply conduit 83 and passes upwardly through porous plates 80, 81 and 82 (into each bed) in sufficient quantity and at a sufficient pressure to achieve fluidization of the particles in each bed. The stream of fluidizing air is pressurized by conventional blowers well known to those skilled in the art. It is important that the particles be maintained in an essentially fluidized condition, i.e., such that substantially all of the particles are caused to move continuously in an essentially random, gently rolling manner, throughout the coating steps. Maintaining the particles in a fluidized condition is essential for the particles to be uniformly coated without significant agglomeration.

In the form of the invention shown in the drawings, regions of differing air velocity are maintained in a plurality of distinct fluidized beds. A central region having a somewhat higher air velocity is located in each fluidized bed. On each side of the higher air velocity region are regions having somewhat lower air velocity.

Figure 4:
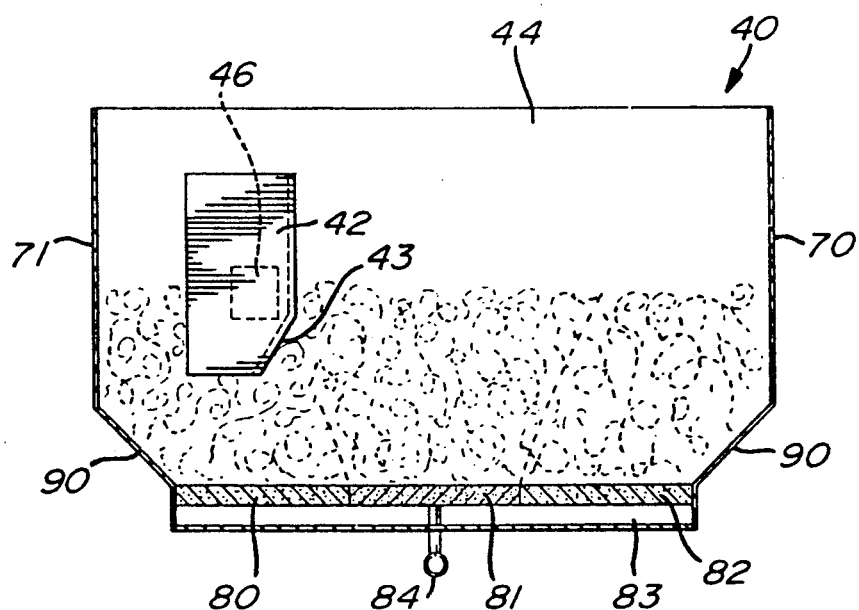
FIG. 4 is a transverse cross-sectional view of the same coating zone of the coating apparatus of FIG. 2 showing the conduit between the different zones of the fluidized bed, along the line IV—IV.

Perforated plates may be used to create such higher and lower velocity regions in the fluidized beds, as illustrated in FIGS. 1, 3, and 4. At the bottom of zone 50 are a plurality of porous plates 80, 81 and 82. Preferably, porous plates 80 and 82 both have a similar number of small openings through the plate which allow air to pass upward through the plate, but which are small enough to prevent particles from falling down through the plates. It will be understood, however, that the openings need not be of any particular size, since the air pressure through the apertures is sufficient to ensure that particles will not fall through the plates. Porous plate 81, located between plates 80 and 82, has a higher fraction of open area to allow more air to pass through plate 81 than either of plates 80 or 82. The outside edge of plates 80 and 82 meet with bottom walls 90. Preferably, bottom walls 90 are angled upwards and connect with side wall 70, although it will be understood that other side wall configurations may also be used. Porous plates 80, 81, and 82 extend for the entire length of apparatus 10. An air supply conduit 83 is located below porous plates 80, 81, and 82.

By providing regions of differing air velocities in the coating zones, the central area of the bed is subjected to a somewhat greater fluidizing force and, thus, the particle level above this area of the coating zone rises to a higher level than the level of the side lower air velocity zones. In addition, it is believed that the differing air velocities and pressures causes a gentle "circulating" action, in which the particles are caused to circulate in and out of the higher velocity region. It is important to note, however, that this circulating action is quite different from the particle motion in a Wurster-type spouted bed, in which the particles are pneumatically conveyed in a controlled, cyclical fashion. In the apparatus and method of the present invention, the particles are still maintained in an essentially fluidized condition characterized by substantial randomness of particle motion.

Circulation of the particles within the fluidized bed is an important aspect of the present invention which assists in producing coated particles having a narrow distribution of coating thicknesses and the desired release characteristics. It is believed that this gentle circulating action causes the particles to pass repeatedly in and out of proximity with the spraying means in a single fluidized coating bed and to thereby build up a coating over time. In normal continuous operation, it is believed that significant quantities of the particles make up to 60–90 cycles per minute through some portion of the coating spray within a single fluidized bed. However, it will be understood that this range may vary depending on the size of the beds and the parameters at which the system is operated. For example, when higher flow rates are used, it will be understood that the particles will tend to make fewer cycles through the coating spray.

It will also be understood that not all areas of the bed need to be subject to the fluidizing force, as long as substantially all of the particles can be maintained in an essentially fluidized condition without significant regions of stagnation.

In a fluidized bed having regions of differing air velocity, the air from the higher velocity region tends to extend into the lower air velocity region as it passes upwardly through the bed. Thus, the density of particles in the higher air flow velocity region of the fluidized bed is less than the density of particles in the lower flow region. This difference in density is shown in FIG. 3, which is a cross-sectional view of bed 40 along the line III—III in FIG. 2. The air from the higher air velocity zone over porous plate 81 tends to expand into the low air velocity zone over porous plates 80 and 82 so as to cause a density gradient through the bed. This gradient is generally represented by the broken lines extending upwards from the corners of plate 81. This density gradient is also seen in FIG. 4, which is a cross-sectional view of bed 40 along the line IV—IV in FIG. 2.

It will be understood that regions of differing gas velocity may be created in portions of the bed other than those shown in the drawings. For example, the apparatus could be designed so that multiple regions of higher gas velocity alternate with regions of lower gas velocity. In addition, other means may be used to create differing gas velocities within the bed, such as baffles, expansion sections, or a system of dampers in which slidable plates with matching apertures can be moved in and out of alignment to create varying orifices and, thus, varying gas flows.

In addition to coating regions of differing air velocity within a single coating zone, it is also possible to vary the air velocity between coating zones in order to control the force of fluidization of the particles and to provide the capability of adjusting of the relative humidity in each coating zone. This can be accomplished by providing separate air supply chambers ("plenums") with separate air supplies beneath the fluidized bed coating zones. Such an arrangement is particularly desirable when it is necessary to segregate the gas used in those coating zones in which an organic solvent-based coating is applied, such as when a vaporized solvent must be removed from the gas before it is discharged into the atmosphere.

Alternatively, dampers may be provided to control the air supply flowing into one or more of the beds from a common air supply plenum. When dampers are used, they should be located sufficiently below the fluidizing plates so that turbulence caused by flow regulation does not affect the operation of the fluidized bed. It will also be understood that a combination of separate plenums and common plenums with dampers may also be used, as required. For example, as the particles pass through successive coating zones, they tend to increase in density due to the buildup of coating. As the density of the particles increases, higher gas pressures are required to maintain the particles in a fluidized condition. Accordingly, dampers or separate plenums may be used to increase the pressure of the fluidizing gas in the later coating zones.

The apparatus of the present invention is also equipped with means for applying the coating material onto the substrate particles. As best seen in FIGS. 1 and 2, in one form the means for applying the coating comprises a conventional coating spray nozzle 58 well known to those skilled in the art. When the apparatus is provided with regions of differing air velocity, the means for applying the coating material onto the particles is preferably located so that application of the coating occurs within a higher air velocity region. (See the location of spray head 58 in FIGS. 1 and 2.) Thus, in the apparatus shown in FIGS. 1 and 2, the nozzle 58 is centrally located in porous plate 81 and may protrude upwardly into the bed. The nozzle 58 is connected to coating supply pipe 84 which passes through plate 81.

In one embodiment of the invention, a single nozzle is provided in each coating zone. However, the number and location of spray nozzles may vary depending on the size of each fluidized bed coating zone. For example, in certain applications it may be desirable to utilize multiple spray nozzles in a single coating zone to increase the production rate. Thus, for example, when multiple regions of higher gas velocity are provided by using several porous plate "strips" which run the length of the coating zone, it may be desirable to use multiple spray heads in each such higher gas velocity region. This arrangement may be preferable when the coating zones are made larger to achieve higher flow rates. However, in a distinct fluidized bed coating zone having more than one spray nozzle, it is not necessary that the particles pass in the vicinity of each spray nozzle, or pass in the vicinity of all of the nozzles of the distinct fluidized bed coating zone in series. It is sufficient that the particle has a probability of passing through the spray of at least one spray nozzle in each distinct fluidized bed coating zone. Thus, higher flow rates may be attainable when additional spray heads are present in a single coating zone, as long as the residence time of the particles in the coating spray is properly controlled to prevent excessive or insufficient coating.

With regard to the location of the spray nozzle, the nozzle may protrude as much as several inches into the fluidized bed or it may be located so as to be essentially level or flush with the bottom of the fluidized bed coating zone, with the spray being directed in a generally upward direction. The precise location of the nozzle will depend upon a number of factors, including the coating material used, the temperature of the coating solution, and the pressure of the fluidized bed. Again, however, it will be understood by those skilled in the art that the spray nozzle may be located at the top of the fluidized bed coating zone such that the coating is sprayed in a generally downward direction. Likewise, the spray nozzle may be located flush with, or protruding from, a side wall of a coating zone such that the coating spray is directed in a generally horizontal or an angled direction into the coating zone. When the nozzle is positioned so that it is protruding upwardly from, or flush with, the bottom of the fluidized bed, it is preferred to use an extension to avoid having the nozzle body interfere with air flow through the fluidizing plate.

Numerous coating materials may be applied to the particles in the practice of the invention. Generally, coating materials which may be used in the production of slow and controlled release fertilizers are those which have good water barrier properties. For example, the coating material may be an organic solvent-based coating material, or it may be a hot melt coating material which can be heated to liquefy the coating material. Examples of solvent-based coating materials which may be used in the practice of the present invention include polyvinylidene chloride, polyvinyl chloride, and low density polyethylene dissolved or dispersed in solvents such as perchlorethylene or methylene chloride. Solvent-based paints, as well as solutions or dispersions of epoxy resins, may also be used. Examples of hot melt coating materials which may be used include molten sulfur, wax, polyethylene, and even molten metal coatings.

The coating material may also be a liquefied stream of the substrate material, in order to effect granulation or additional buildup of the substrate particles. Examples of coating materials which may be used in this manner include a liquefied stream of urea, as well as sulfur, ammonium nitrate, liquefied potassium nitrate, and other fertilizer salts having a relatively low melting point. The coating material may also be formed when two or more reactive materials are applied to the surface of the particles where they react to form a water barrier coating. An example of such two or more component reactive systems is a polyol and an isocyanate, which react under catalytic conditions to form polyurethane coatings. Likewise, catalytic reactions between urea and formaldehyde, as well as reactive epoxy materials, may also be used as multicomponent reactive systems.

Aqueous based coating materials, such as an aqueous polymer solution and, more preferably, an aqueous film forming latex, have also been used with success. In particular, commercially available coating materials which include aqueous film forming latexes comprising a polyvinylidene chloride-containing polymer or copolymer have been used. Other aqueous film forming latexes which may be used in the practice of the invention include vinyl acetate and polymethylmethacrylate copolymers. In general, most commercially available latex polymers may be used as coating materials in the practice of the invention.

It will be understood that different types of coatings and different apparatus for applying the coatings will require that the temperature of the coating apparatus be maintained at certain preferred temperatures. For example, when molten coatings are used in a spray head, it is necessary to maintain the temperature of the spray head at a level which is above the melting point of the coating to prevent the coating from solidifying on the spray head. Likewise, when other coatings are used, it may be important to cool the coating prior to spraying to ensure that the coating material does not coalesce or harden on the spray head, causing undesirable plugging of the spray head. In unusual situations, the coating material may be used at ambient temperature without heating or cooling. In addition, it may be necessary to use filters in the coating supply conduits and/or in the spray nozzle to prevent coagulated or coalesced coating from plugging the spray head.

Likewise, it will also be understood that when heating or cooling of the coating material is required, conventional heating and cooling apparatus, such as heat exchangers and heating or cooling tubes positioned around the spray delivery conduits and spray head, may be used. In certain instances, coating buildup can also be avoided by applying well-known non-stick coatings, such as TEFLON and the like, to the surfaces of the spray head.

The amount of coating applied depends on the coating material used, the process conditions during coating, and the desired water barrier properties. Generally, the dried coating material comprises 1 to 12% by weight, and preferably 3 to 8% by weight, of the total weight of the coated particle.

When the particle to be coated is water sensitive and the coating material is an aqueous based material, it is preferred that the coating in at least the first fluidized bed coating zone be applied at a relative humidity which is below the critical relative humidity of the particles. To achieve this, it is important to control the humidity of the inlet air into the coating zone so that the humidity within the coating zone is never permitted to exceed the critical relative humidity of the substrate particle. The critical relative humidity is of the most importance in the initial phase of the coating process, and is of less importance once a preliminary coating has been established on the fertilizer granule, since the preliminary coating is believed to act as a barrier to the moisture in subsequent coating zones. Thus, the relative humidity may be allowed to increase in any subsequent coating zones, or in any subsequent plurality of coating zones.

If necessary, the air entering beds 20 and 30 is dried to ensure that the relative humidity of the inlet air and in the coating chamber is maintained below the critical relative humidity of the substrate particles being coated. To accomplish this, the apparatus of the present invention may also include a means for maintaining the relative humidity of the gas in at least the first of said fluidized bed coating zones below the so-called critical relative humidity of a water sensitive particles. The drying means is preferably a heater which heats the gas fed to at least the first fluidized bed coating zone or, in some instances, to at least the first plurality of coating zones, to a temperature such that the relative humidity of the gas entering and within the fluidized bed coating zone is lowered to a value below the critical relative humidity of the water sensitive particle to be coated. Drying agents, such as silica gel or aluminum oxides, could also be used. Additionally, refrigeration means could be used to condense, and thus remove, water from the gas being supplied to the coating zone. The refrigeration means may be an air conditioner used in conjunction with a heater so that water is removed from the gas prior to heating. Because dehumidification often requires large amounts of energy, however, it is preferred to use coatings having higher coalescing temperatures so that the relative humidity may more easily be kept within acceptable limits.

In addition, it will be understood that the particles may be subjected to so-called "preheating" prior to entering a coating zone to improve coating efficiency. This can be accomplished in a fluidized bed chamber in which no coating takes place, but in which the particles are heated by the fluidizing gas. However, preheating, as well as other non-coating steps, need not take place in a fluidized bed. For example, the particles could be preheated in two or more batch-type rotary drums, with the preheated particles being fed from alternate drums into the coating chambers.

The present invention also includes a transfer means for transferring particles from one coating zone to another. The transfer means may be any device or arrangement which permits particles to move from one coating zone to a subsequent coating zone. Preferably, the transfer means will cause the majority of particles to move from one bed to a subsequent bed, and minimize "back-flow" of particles from one bed to a previous bed. It is particularly important that such back-flow be minimized in the practice of the present invention, since back-flow makes it difficult to control the average residence time of the particles in the coating zones. This, in turn, can cause the distribution of coating thicknesses on the particles to fall outside of desirable limits. The transfer means may be a baffle or series of baffles which the particles must pass under, over, or around. The transfer means may also be an opening in the partitions between the fluidized beds, through which the particles may pass. The rate at which the particles pass through the opening may then be controlled by the size, shape and location of the opening.

Preferably, the partition openings are in communication with conduit means so that the entrance and exit points of the particles may be controlled. The conduits may take the form of "downcomers" 22, 32, 42, 52, which, as described in detail below, are designed to prevent back-flow between the chambers. The openings between the coating zones are made adjustable in height and opening by means of a baffle which can take the form of a window weir. This window weir can be used to adjust the flow of particles through the downcomer, and to control the height of the particles in the fluidized bed. The weir can also be used to close the upper opening, or to raise the height of the upper opening.

It is desirable to stagger the location of openings between coating zones such that the entrance opening into a coating zone is located diagonally across from the exit opening out of that zone. In this way, it is believed that more of the particles are caused to pass in the vicinity of the spray head. In a preferred form illustrated in FIG. 1, the openings 26, 36, 46, 56 to downcomers 22, 32, 42, 52 are located adjacent to corners of the fluidized beds. Each succeeding opening and downcomer is located diagonally across from the previous opening and downcomer so that they are "staggered" from one coating zone to the next. However, it will be understood that the conduits may be positioned in other locations, as long as back-flow of the particles from one bed to a previous bed is minimized.

As illustrated in FIGS. 1, 2, and 4, the openings 26, 36, 46, 56 into the feeder downcomers 22, 32, 42, 52 are preferably positioned near the topmost level of the bed of particles so that the particles are "skimmed" from the top of the beds for transfer into the next coating zone. A portion of each downcomer 22, 32, 42, 52 extends above the openings to further prevent backflow. In a further preferred arrangement, the downcomers are configured so that the air velocity pressure within the conduit drops from bottom to top, wherein the air velocity pressure is the impact pressure of a moving air flow. This is accomplished by tapering each downcomer so that it has a reduced cross-sectional area at its lower end. (The tapered lower ends of the downcomers have been given reference numerals 33, 43, 53, and 63 in FIGS. 1 and 4. The tapered lower end of downcomers 22 and 42 are not visible in FIG. 1.) Because less fluidizing air can enter the lower ends 33, 43, 53, 63 of the downcomers, there is less air velocity pressure and, thus, less fluidization in the downcomer. As a result, the particles tend to flow into the next coating zone and are less likely to pass back through openings 26, 36, 46, 56. This further improves the probability that particles will pass through each coating zone in series and reduces the chance of particles passing backwards through coating zones and thus receiving excess coating layers.

As illustrated in FIGS. 1, 2, and 4, the openings 26, 36, 46, 56 are located nearer to the topmost level of the bed of particles, while the lower ends 33, 43, 53, 63 of the downcomers are located closer to the bottom of the coating zone. It is believed this aids in ensuring that particles not only must travel across the bed, but from the bottom to the top of the bed. It is also believed that this helps to ensure adequate mixing of the particles of the bed. This could also be achieved by providing a series of baffles, weirs and the like, which cause the particles to travel from top to bottom in the bed. It will also be understood that the opening and exit may be positioned at other locations along the walls of the coating zone, as required.

In operation, fertilizer particles, such as urea particles of 7 to 9 mesh diameter, are continuously fed from an overhead supply hopper (not shown) into feeder conduit 22. (It is preferred that the urea particles be handled gently to avoid crazing, chipping, or cracking the raw material.) The particles then fall through conduit 22 and enter into coating zone 20. The air supplied to coating zones 20 and 30 is heated to 45° C. and the relative humidity of the inlet air is monitored.

The fluidized bed of fertilizer particles in coating zone 20 is filled to a level where particles randomly pass through opening 36 in partition 34 and fall through feeder conduit 32 into the second coating zone 30. Thus, the height of the fluidized bed in each zone is controlled by the location of the opening into the adjacent bed, which is preferably adjustable, as noted above. In a preferred arrangement, shown in FIG. 2, opening 36 is located so that spray nozzle 28, and the bottom of feeder conduit 22, are located below the top of the fluidized particle bed.

An aqueous film forming latex is fed through latex supply pipe 84 and is sprayed into coating zone 20 through spray nozzle 28 (FIG. 2) and coats the urea particles in the area surrounding the nozzle with a thin coating of latex material to form preliminary coated particles. The water from the latex material is evaporated in the heated air flow through the fluidized bed and exits out the top of the bed. The air leaving the coating zone can be released to the atmosphere after being water scrubbed to remove excess latex, since it contains no organic solvents. Alternatively, the air can be dried and recycled back to air supply conduit 83. When organic solvent-borne coatings are used, the evaporated solvent must be collected so that it can be properly disposed of or condensed and then recycled for reuse.

The preliminary coated particles subsequently pass through each fluidized bed coating zone 30, 40 and 50 where they receive a further thin coating of the latex material. The particles which exit coating zone 50 each have, on average, a coating of the latex material which provides suitable water barrier properties to allow the coated urea to be used as a slow and controlled release fertilizer. Means are also provided for continuously removing the substrate particles from the coating zones. For example, the coated particles continuously exit coating zone 50, and may be collected in a hopper (not shown) for packaging or further processing. As long as the particles are continuously exiting the apparatus, they are also being continuously removed from the earlier coating zones.

The air supplied to coating zones 40 and 50 is the same air as that supplied to coating zones 20 and 30. However, the air for these zones can be supplied from a different air source, as described above, since control of the relative humidity is not as critical in these beds as in beds 20 and 30, for the reasons described hereinabove. Further, the aqueous latex fed to each coating zone can be varied so as to provide a coated particle having different layers of different latex materials. In this manner, a primer coat could be applied, for example, which would provide a base coat for better adhesion of a subsequent barrier coat applied in a later coating zone. Similarly, a "double release" fertilizer could be made by adding a layer of coating followed by a layer of the substrate fertilizer and then a further layer of the same or a different coating. Depending on the moisture barrier properties of the coatings used, the fertilizer would be released in successive stages as dissolution of the coating layers takes place over time.

Although in the drawings an apparatus is depicted as having four coating zones, one skilled in the art could easily envisage an apparatus having more coating zones, or having more spray nozzles in each distinct fluidized bed. Further, additional fluidized bed zones could be added to the apparatus which would be used for drying only, and thus would not have an operational spray nozzle located within those zones. In such drying compartments, baffles may be provided which extend from the side walls partially into the fluidized bed. In this manner, the drying particles are caused to travel in a serpentine path through the drying compartment. It is believed that this helps more of the particles to dry more completely by reducing forward mixing, minimizing short term retention of some granules, and increasing the contact time between the particles and the drying air.

The fluidized bed coating zones can also be part of fluidized bed coating sections, in which each coating section comprises one or more fluidized bed coating zones. Preferably, the apparatus has a first and a second plurality of fluidized beds as a first coating section and a second coating section, respectively. The first and second plurality of fluidized beds may also be separated by, preceded by, or followed by, one or more fluidized bed drying zones which do not contain spraying means. In these drying zones, the particle coating is dried to provide a preliminary coated particle to which further coating layers may be applied, or to finally dry the particle and thus provide enhanced coated particles. If acceptable properties are achieved, particularly when the release rate of the fertilizer is not critical, the preliminary coating may be used as is. Typically, however, in order to achieve the higher quality product, additional coating thickness can be added to produce an enhanced coated particle.

Similarly, the preliminary coated particles may also be passed in series through a second plurality of fluidized bed coating zones wherein, within each of the coating zones, an additional coating is applied to provide enhanced coated particles. In the process, the first and second plurality of fluidized bed coating zones may be preceded by, separated by, or followed by one or a plurality of drying zones, in which no coating material is sprayed.

The preliminary coated particles may also be passed through one or a plurality of fluidized beds between the first and second coating zones to remove water from the particles. This process stage assists in drying the particle coating prior to the second coating zone, and ensures that the preliminary coating will act as an adequate barrier so that coating in the second coating zone may be conducted at higher relative humidities.

The temperature in the coating zones must be sufficient to ensure that the coating dries quickly and, preferably, such that the relative humidity for the temperature selected is not allowed to increase above the critical relative humidity of the substrate particles. Thus, the temperature used, particularly in the first coating zone, or coating section, depends on the critical relative humidity of the water sensitive particle, the relative humidity of the gas to be fed to the coating zone, the amount of coating material which will be sprayed into the coating zone, and the gas flow through the coating zone. However, the temperature must not be allowed to increase to the point where the water sensitive material will melt and thus cause the partially or completely coated particles to agglomerate together.

Likewise, the temperature of the fluidized bed must be low enough that the coating material itself is not melted. In a situation where a hot melt polymer is used as the coating material, the fluidized bed temperature must be low enough to cool and, thus, solidify, the polymer coating.

Since removal of water, in an aqueous-based system, is of the most importance in the first coating zones, the temperature is preferably higher in the first plurality of coating zones, and most preferably higher in the first coating zone, in order to provide, in general, the lowest relative humidity of the various coating zones. Since higher relative humidities can be tolerated in subsequent zones, the temperature in the second plurality of coating zones may be less than the temperature in the first plurality of coating zones. However, it will be understood that it may be necessary or desirable to maintain the relative humidity below the critical relative humidity of the particles in each of the coating zones or sections.

As described above, the present invention provides a process in which each of the first or second plurality of coating zones may comprise one or a plurality of distinct fluidized beds. Each distinct fluidized bed may, however, be fitted with a plurality of spray nozzles positioned so that, on average, each particle is coated by a number of nozzles in each distinct fluidized bed. Alternatively, each distinct fluidized bed may have one coating spray nozzle, and both the first and second plurality of coating zones may comprise more than one distinct fluidized bed. Thus, each coating zone may be a distinct fluidized bed and may have one or more coating spray nozzles.

It has been observed that the slow and controlled release properties of the product particles, especially those which have been coated with latex coatings according to the present invention as described above, may improve if the product obtained is held at room temperature (e.g. 20° C.) for a period of time of about one month. This improvement in release rate can be determined by measuring the dissolution rate of the particle core (i.e., the rate at which a sample of water sensitive coated particles, stored in water, will dissolve into the water). It will also be understood that, depending on the conditions under which the particles are stored, shorter or longer holding times may be possible or desirable.

Improved release rates can also be obtained by "post-heating" the coated particles. Post-heating is preferably conducted in additional fluidized bed or beds, after the final coating zones and/or sections. However, it will be understood that post-heating may be conducted in other conventional apparatus, such as rotary drums or pans. It has been found that improved release rates can be obtained by post-heating at a temperature of about 60° C. and, more preferably, of about 75° C., for about 30 minutes. The gas (generally air) used in post-heating may be recycled through a conventional baghouse and steam heater to conserve energy.

Not to be bound by theory, it is believed that attaining the slower dissolution rate of the coated particles, which may also be termed an improved release rate, is dependent upon ensuring adequate coalescence of the coating film. Post-heating of the particles at about 60° C. for 30 minutes is believed to be adequate to enhance coalescence.

In order to prevent agglomeration of the coated particles in general, or in the post-heating stage in particular, the coated particles may also be treated with a "conditioning" agent by dusting or covering the coated particle with a thin coat of a material such as talc or clay or, preferably, powdered calcium carbonate. A product known as calcium carbonate OMYCACARB UF, has been used with particular success, and is believed to be especially desirable as a conditioning agent when acidic coatings are used. The calcium carbonate is metered and then air is aspirated into a fluidized bed containing the particles. The amount of calcium carbonate used is preferably 0.3 to 0.5% of the total particle weight.

A further significant aspect of the present invention is the particulate composition produced by means of the process described above. The substrate particles of the composition are substantially coated with a coating material, such as, by way of example, a film forming latex. The coated particles which comprise this composition have a particularly narrow range of coating thicknesses across the population of particles. Such a narrow range of coating thicknesses is especially desirable for slow and controlled release fertilizers since, as previously noted, this makes it possible to control the release rate of the fertilizer more carefully. On the other hand, compositions with a wide range of coating thicknesses tend to have erratic release rates, making them less desirable as slow and controlled release fertilizers.

Because no coating process achieves perfect uniformity in coating thickness, there will always be some variation in coating thicknesses across a population of particles. This variation can be modelled on the basis of a standard "bell-shaped" or Gaussian curve. It is possible to quantify the distribution of coating thicknesses across the population of particles using the concept of standard deviation. Standard deviation is a measure of how much the population varies from the average or "mean." A higher standard deviation signifies a greater difference from the mean, while a lower standard deviation signifies a lower difference from the mean. When applied to a population of particles having variable coating thicknesses, it will be seen that a higher standard deviation signifies a greater degree of variability in coating thickness and, thus, less uniformity in thickness. On the other hand, a lower standard deviation signifies less variability in coating thicknesses and, thus, more uniformity.

In the practice of the present invention, it has been found that the greater the number of coating zones the substrate particle passes through, the more uniform the coating thickness across the population of particles. It is believed that as the number of coating zones increases, the probability of a particle avoiding contact with the coating spray or, alternatively, being coated excessively, diminishes. Thus, in an apparatus with two distinct coating zones, modelling suggests that the normalized standard deviation from the average coating would be approximately 0.71. In an apparatus with ten distinct coating zones, the normalized standard deviation would be approximately 0.32. It is projected that in an apparatus with 100 distinct coating zones, the normalized standard deviation would approach 0.10. It can thus be seen that the process of the present invention produces a composition having a desirable narrow range of coating thicknesses.

It will be understood, however, that the foregoing coating thickness distribution may vary somewhat if multiple spray nozzles are used within each distinct fluidized bed to create several coating zones in each bed. In that event, it is believed that all of the coating zones would approach, but probably not equal, the operation of an equal number of distinct fluidized beds.

In a preferred form, as noted above, the substrate particles comprise a water-sensitive fertilizer material, such as urea, and the coating comprises an aqueous film forming latex. However, other substrate particles and coatings may also be used, as noted above. Sufficient quantities of coated particles may be produced on a continuous basis in accordance with the above process so that coated particles may be made as part of a large-scale manufacturing operation.

In order to further illustrate the invention, the following specific examples are given.

EXAMPLES 1-9

A series of coating operations were conducted in a multi-stage fluidized bed similar to the fluidized bed apparatus described above and depicted in the drawing Figures. The fluidized bed used for the coating operations had a total of 14 fluidized beds in series. The first fluidized bed was used to pre-heat the particles to be coated. The next three fluidized beds were utilized as a first plurality of coating zones wherein a preliminary coating was applied to the particles. The preliminary coated particles were partially dried in the fifth fluidized bed, and an enhanced coating was applied in the sixth through the twelfth fluidized beds. The enhanced coating was further dried in the thirteenth fluidized bed, and the enhanced coated particles were conditioned in the fourteenth fluidized bed. After conditioning, the particles were cooled in a separate fluidized bed. This bed was located on a different plenum from the others so that the heated air used in beds 1-14 could be recycled. It will be understood, however, that this bed need not be located on a separate plenum, but could be located on the same plenum.

The particles coated were generally round urea particles, except where noted, of about 7 to 9 mesh and had a critical relative humidity of about 70 to 75%.

The quality of the coated fertilizer that was produced was measured by determining the 7-day release rate of the fertilizer. The TVA 7-day dissolution test procedure was followed, in which a 20 g sample of the coated particles is soaked in 100 g deionized water for 7 days. The amount of fertilizer lost from the particles is measured by rotating the sample three times to obtain proper mixing, removing aliquots of the solution sufficient for analysis by pipetting, and then analyzing the solution for the nutrient substrate material. A lower 7-day release rate is indicative of a slower release rate of the fertilizer in use. Desired 7-day release rates for slow and controlled release fertilizers are generally below about 50% and, more preferably, below about 30%.

The coating operation was conducted over periods of several hours to several days on a continuous basis producing either 45 or 90 kg per hour of coated product. The coating material was applied so as to produce coating levels about 3 to 10% by weight of the final coated product.

The following Table gives the results of nine runs made using this apparatus. In the Table, each run is given a designation number. The types of latex used are also coated by number as follows: 1 represents HALOFLEX 202, 2 represents DARAN SL112, and 3 represents Asahi/Dow L302. Other parameters for each run and the average properties of the product produced are also provided.

| | Run Number | | | | | | | | |
|---|---|---|---|---|---|---|---|---|---|
| | 1 | 2 | 3 | 4 | 5 | 6 | 7 | 8 | 9 |
| Length of run (hrs.) | 9.5 | 9 | 10 | 5 | 12.5 | 6.5 | 5.5 | 7 | 7 |
| Production Rate (lbs/hr) | 100 | 100 | 100 | 100 | 200 | 220 | 220 | 150 | 200 |
| Fertilizer feed rate (lb/hr) | 96 | 95 | 95 | 95 | 192 | 216 | 216 | 144 | 192 |
| Latex spray rate (g/min) | | | | | | | | | |
| Prelim. Coat | 24 | 47 | 38 | 49 | 50 | 50 | 50 | 65 | 65 |
| Enhanced coat | 66 | 131 | 105 | 144 | 150 | 155 | 155 | 170 | 170 |
| Absolute humidity (lbs water/lb dry air) | — | .008 | .010 | .010 | .011 | — | — | .011 | — |
| Total air flow to Coating Unit (CFM) | 3900 | 4200 | 3900 | 3900 | 3900 | — | — | 4800 | 4800 |
| Temperatures (°C.) | | | | | | | | | |
| Preheat | 50 | 60 | 60 | 60 | 60 | 60 | 60 | 60 | 60 |
| Coating units | 30 | 45 | 45 | 45 | 45 | 46 | 46 | 42 | 42 |
| Post heat | 79 | 56-38 | 77 | 77 | 75 | 79 | 78 | 80 | 80 |
| Latex | | | | | | | | | |
| Type | 1 | 2 | 2 | 2 | 2 | 3 | 2 | 2 | 2 |
| Solids | 35 | 35 | 35 | 35 | 35 | 35 | 35 | 35 | 35 |
| Fertilizer | | | | | | | | | |
| Type | Urea | Urea | Urea | Urea | Urea | Urea | Urea | NPK | NPK |
| Particle Size (mesh) | 7-9 | 7-9 | 7-9 | 7-9 | 7-9 | 7-9 | 7-9 | 7-10 | 7-10 |
| Product Quality | | | | | | | | | |
| Latex coating (% by wt.) | 5.8 | 7.0 | 5.9 | 7.5 | 4.5 | 4.4 | 4.5 | 6.3 | 4.7 |
| 7 day release rate (%) | 41 | 28 | 19 | 10 | 35 | 44 | 59 | 37 | 60 |

EXAMPLES 10-13

The apparatus described in Examples 1-9 above was used to perform four additional coating runs identified by designation numbers 10-13 in the Table which follows. The particles coated were generally round urea particles, except that granular potassium nitrate was used as the substrate in the run designated No. 13.

|  | Run Number | | | |
| --- | --- | --- | --- | --- |
|  | 10 | 11 | 12 | 13 |
| Length of run (hrs.) | 3.5 | 32 | 50 | 6 |
| Production Rate (lbs/hr) | 400 | 200 | 200 | 200 |
| Fertilizer feed rate (lb/hr) | 382 | 192 | 200-150 | 95 |
| Latex spray rate (g/min) | | | | |
| Prelim. Coat | 90 | 48 | 50 | 47 |
| Enhanced coat | 263 | 148 | 150 | 145 |
| Absolute humidity (lbs water/lb dry air) | .011 | — | — | — |
| Total air flow to Coating Unit (CFM) | 4500 | — | — | 4200 |
| Temperatures (°C.) | | | | |
| Preheat | 60 | 60 | 60 | 60 |
| Coating units | 45 | 45 | 45 | 45 |
| Post heat | 75 | 75-80 | 75-80 | 77 |
| Latex | | | | |
| Type | 2 | 2 | 2 | 2 |
| Solids | 35 | 35 | 35 | 35 |
| Fertilizer | | | | |
| Type | Urea | Urea | Urea | $KNO_3$ |
| Particle Size (mesh) | 7-9 | 7-9 | 7-9 | 7-10 |
| Product Quality | | | | |
| Latex coating (% by wt.) | 4.5 | 4.4 | 4.7-6.1 | 4.5 |
| 7 day release rate (5) | 56 | 38 | 35-26 | 16 |

Having described several specific embodiments of the present invention, it will be understood that modifications thereof may be suggested to those skilled in the art, and it is intended to cover all such modifications as fall within the scope of the appended claims.

We claim:

1. A process for the continuous coating of water-sensitive fertilizer substrate particles comprising:
    providing a plurality of fluidized bed zones for maintaining fertilizer substrate particles in a fluidized condition by means of a fluidizing gas, said fluidized bed zones including at least first and second fluidized bed coating zones;
    providing spraying means in said first and second fluidized bed coating zones for applying a coating material onto particles in said fluidized bed coating zones;
    continuously feeding substrate particles into said first fluidized bed coating zone and applying coating material to the particles while fluidized therein;
    transferring said particles from said first fluidized bed coating zone to said second fluidized bed coating zone and spraying coating material onto the particles while fluidized therein;
    continuously removing coated substrate particles from the second fluidized bed coating zone; and
    maintaining the relative humidity of the fluidizing gas in at least the first of said fluidized bed coating zones below the critical relative humidity of said particles.

2. A process as claimed in claim 1 in which five or more fluidized bed coating zones are provided.

3. A process as claimed in claim 1 in which ten or more fluidized bed coating zones are provided.

4. A process as claimed in claim 3 in which said particles are maintained in fluidized condition by a pressurized stream of gas.

5. A process as claimed in claim 4 in which said gas is air.

6. A process as claimed in claim 1 in which each of said plurality of fluidized bed coating zones is a distinct fluidized bed.

7. A process as claimed in claim 1 in which said spraying means comprises a spray nozzle.

8. A process as claimed in claim 4 in which at least one of said fluidized bed coating zones is provided with a higher gas velocity region and a lower gas velocity region.

9. A process as claimed in claim 8 in which said spraying coating material onto the particles takes place while said particles are located within said higher gas velocity region.

10. A process as claimed in claim 9 in which said higher gas velocity region is a central longitudinal region passing through each fluidized bed and is located between longitudinal lower air velocity regions on either side of said higher air velocity region.

11. A process as claimed in claim 1 further comprising preheating said substrate particles prior to feeding the particles into said first fluidized bed coating zone.

12. A process as claimed in claim 1 further comprising heating said substrate particles after coating to facilitate formation of a toughened coating.

13. A process as claimed in claim 1 further comprising cooling said particles after coating.

14. A process as claimed in claim 1 further comprising treating said particles with a conditioning agent after coating.

15. A process for the continuous coating of fertilizer substrate particles comprising:
    providing a plurality of fluidized bed zones for maintaining fertilizer substrate particles in a fluidized condition by means of a fluidizing gas, said fluidized bed zones including at least first and second fluidized bed coating zones;
    providing spraying means in said first and second fluidized bed coating zones for applying a coating material onto particles in said fluidized bed coating zones;
    continuously feeding substrate particles into said first fluidized bed coating zone and spraying coating material onto the particles while fluidized therein;
    transferring said particles from said first fluidized bed coating zones to said second fluidized bed coating zone and spraying coating material onto the particles while fluidized therein, said particles being transferred by a transfer means which comprises a conduit having an upper opening in the upper portion of the first fluidized bed coating zone and a lower opening in the lower portion of the second fluidized bed coating zone so as to cause particles from said first fluidized bed coating zone to enter said conduit at said upper opening, and to exit said conduit at said lower opening into said second fluidized bed coating zone; and
    continuously removing coated substrate particles from the second fluidized bed coating zone.

16. A process as claimed in claim 15 wherein said conduit is fitted with an adjustable baffle at said upper opening in order to control the bed height of said first fluidized bed.

17. A process for the continuous coating of fertilizer substrate particles comprising:
   providing a plurality of fluidized bed zones for maintaining fertilizer substrate particles in a fluidized condition by means of a fluidizing gas, said fluidized bed zones including at least first and second fluidized bed coating zones;
   providing spraying means in said first and second fluidized bed coating zones for applying a coating material onto particles in said fluidized bed coating zones;
   continuously feeding substrate particles into said first fluidized bed coating zone and spraying coating material onto said particles while fluidized therein;
   maintaining the relative humidity in the first fluidized bed coating zone below the critical relative humidity of the fertilizer substrate particles;
   transferring said particles from said first fluidized bed coating zone to said second fluidized bed coating zone and spraying coating material onto the particles while fluidized therein; and
   continuously removing coated substrate particles from the second fluidized bed coating zone;
   wherein said coating material sprayed onto the particles in said second fluidized bed coating zone is a material including the same or a different fertilizer as the substrate particles.

18. A process as claimed in claim 17 in which said coating material is a molten liquid.

19. A process for the continuous coating of water sensitive fertilizer substrate particles comprising:
   providing a plurality of fluidized bed zones for maintaining water sensitive fertilizer substrate particles in a fluidized condition by a pressurized stream of gas;
   providing means in at least two of said fluidized bed zones for applying a coating material onto particles in said fluidized bed zones, to provide at least first and second fluidized bed coating zones;
   maintaining the relative humidity in the first fluidized bed coating zone below the critical relative humidity of the fertilizer substrate particles;
   continuously feeding substrate particles into said first fluidized bed coating zone and coating the particles therein;
   transferring said particles from said first fluidized bed coating zone to said second fluidized bed coating zone and coating said substrate particles in said second zone; and
   continuously removing coated substrate particles from the second fluidized bed coating zone.

20. A process as claimed in claim 19 in which said particles are fed in succession through the fluidized bed coating zones and in which, within said coating zones, a preliminary coat of the coating material is applied to the substrate particles to provide preliminary coated particles.

21. A process as claimed in claim 20 in which said fertilizer is urea.

22. A process as claimed in claim 21 in which said urea comprises 0.1 to 2.0% by weight of a lignosulfonate or of formaldehyde.

23. A process as claimed in claim 20 in which said fertilizer is a water-soluble potassium salt.

24. A process as claimed in claim 20 in which said fertilizer is a water-soluble ammonium salt.

25. A process as claimed in claim 20 in which said fertilizer is an NPK fertilizer.

26. A process as claimed in claim 20 in which said fertilizer is selected from the group consisting of diammonium phosphate, monoammonium phosphate, superphosphate, triple superphosphate, and potassium phosphate.

27. A process as claimed in claim 20 in which said coating material is an aqueous film forming latex.

28. A process as claimed in claim 20 in which said coating material is carried in an organic solvent.

29. A process as claimed in claim 20 in which said coating material is formed by the reaction of two or more reactants on the surfaces of the particles.

30. A process as claimed in claim 29 in which said coating material is formed by the reaction of a polyol and an isocyanate.

31. A process as claimed in claim 20 additionally comprising passing said preliminary coated particles in series through a second plurality of fluidized bed coating zones in which within said second plurality of coating zones, an additional coating of a coating material is applied to provide enhanced coated particles.

32. A process as claimed in claim 31 in which the temperature in the second plurality of coating zones is less than the temperature in the first plurality of coating zones.

33. A process as claimed in claim 31 in which each coating zone is a distinct fluidized bed.

34. A process as claimed in claim 31 in which said preliminary coated particles are passed through at least one drying zone before entering said second plurality of coating zones, in order to remove water from said preliminary coated particles.

35. A process as claimed in claim 31 further comprising conditioning said preliminary coated particles, or said enhanced coated particles by covering the coated particles with a coat of talc, clay, or powdered calcium carbonate.

36. A process as claimed in claim 35 in which calcium carbonate is applied to the coated particles by addition to a fluidized bed containing said coated particles.

37. A process as claimed in claim 35 in which the particles are conditioned by covering the coated particles with 0.3 to 0.5%, as a percentage of the total particle weight, of calcium carbonate.

38. A process as claimed in claim 35 further comprising heating said preliminary coated particles or said enhanced coated particles to a temperature of at least about 60° C. in one or a plurality of fluidized bed zones for at least about 30 minutes in order to provide coated particles with a slower dissolution rate.

* * * * *